(12) United States Patent
Zhao (10) Patent No.: US 10,107,964 B1
(45) Date of Patent: Oct. 23, 2018

(54) FIBER HOLDING TOOL AND A FIBER SPACING ADJUSTMENT METHOD

(71) Applicant: INNO INSTRUMENT (CHINA) .INC, WeiHai (CN)

(72) Inventor: Yangri Zhao, WeiHai (CN)

(73) Assignee: INNO INSTRUMENT (CHINA) .INC, Weihai (CN)

( * ) Notice: Subject to any disclaimer, the term of this patent is extended or adjusted under 35 U.S.C. 154(b) by 0 days.

(21) Appl. No.: 15/864,308

(22) Filed: Jan. 8, 2018

(30) Foreign Application Priority Data

Nov. 14, 2017 (CN) .......................... 2017 1 1124223

(51) Int. Cl.
   *G02B 6/255* (2006.01)
(52) U.S. Cl.
   CPC ......... *G02B 6/2556* (2013.01); *G02B 6/2551* (2013.01)
(58) Field of Classification Search
   CPC ........................... G02B 6/2556; G02B 6/2551
   USPC .......................................................... 385/96
   See application file for complete search history.

(56) References Cited

U.S. PATENT DOCUMENTS

2015/0049991 A1* 2/2015 Kawanishi ........... G02B 6/2551
                                                              385/96
2016/0124150 A1* 5/2016 James ...................... G02B 6/25
                                                              29/428

* cited by examiner

*Primary Examiner* — Jerry Blevins
(74) *Attorney, Agent, or Firm* — Anova Law Group, PLLC (57) ABSTRACT

A fiber holding tool and a fiber spacing adjustment method, which comprises a body and a cover, among which, the body and the cover are pivotally connected by a rotating shaft, and the body comprises a fiber accommodating groove used to accommodate the fiber, wherein, the fiber holding tool comprises a spacing conversion portion that can be rotated relative to the body, and the body comprises a conversion gap accommodating the spacing conversion portion; the spacing conversion portion comprises a plurality of groove bodies of different spacing for accommodating the optical fibers. The fiber holding tool according to the present invention can use the original fusion splicer to weld the ribbon fiber having a diameter of 200 μm, without replacing with a new supporting optical communication device, which results in low cost, and can ensure welding quality, and ease the operation.

10 Claims, 8 Drawing Sheets

FIBER HOLDING TOOL AND A FIBER SPACING ADJUSTMENT METHOD

CROSS-REFERENCE TO RELATED APPLICATIONS

This application claims the priority of Chinese Patent Application No. 201711124223.9, filed on Nov. 14, 2017, the content of which is incorporated herein by reference in its entirety.

TECHNICAL FIELD

The present invention relates to the field of fiber holding tool, specifically to a fiber holding tool and a fiber spacing adjustment method.

BACKGROUND

The optical fiber, a shorthand for light guide fiber, is a fiber made of glass or plastic, which can be used as a light conducting tool. A ribbon fiber is formed in such a manner that a multi-core fiber (4, 6, 8, 12-core, etc.) is stuck together using a special material to form a pair (aka a ribbon), and further, a fiber cable is formed by multiple pairs (ribbons) in accordance with the relevant standard. The previously mentioned ribbon fiber is mainly composed of ribbon fibers (hereinafter referred to as the original ribbon fiber) having a diameter of 250 µm (including coating). With the development of the optical fiber technology, a ribbon fiber (hereinafter referred to as the new ribbon fiber) having a diameter of 200 µm (including coating) has recently appeared. Because the new ribbon fiber has narrower internal spacing and the overall height and width of the fiber are reduced compared with the original ribbon fiber, the original ribbon fiber holding tool cannot clamp the new ribbon fiber. Moreover, due to extremely small internal spacing of the new ribbon fiber, the problem of poor welding effect is apt to occur when it is placed on the fusion splicer for welding. Therefore, the new ribbon fiber cannot be placed on the original fusion splicer for welding.

Patent CN200680001870.4 discloses a fiber holder which is mainly composed of a base, a cover and a limiting part, and the fiber holder can be used to hold the ribbon fiber. However, this holder cannot solve the clamping problem of the new ribbon fiber, and the use of this holder cannot allow a new ribbon fiber to be welded by the original fusion splicer, and in the field of engineering operations, the purchase of new fusion splicers often cost too much.

SUMMARY

The problem to be solved by the present invention is to compensate for the above-mentioned drawbacks of the prior art, and to provide a fiber holding tool capable of converting spacing, clamping, lowering cost and splicing a fiber using the original fusion splicer.

The technical problem of the invention can be solved by the following technical proposals:

A fiber holding tool for the fusion splicer, which comprises a body and a cover, among which, the body and the cover are pivotally connected by a rotating shaft, and the body comprises a fiber accommodating groove used to accommodate the fiber, wherein, the fiber holding tool comprises a spacing conversion portion that can be rotated relative to the body, and the body comprises a conversion gap accommodating the spacing conversion portion.

The spacing conversion portion comprises a plurality of groove bodies for accommodating optical fibers, and the spacing between the end part of the groove body and the tail part is different from each other.

Further, the spacing conversion portion comprises a conversion switch, a converter for converting the spacing of an optical fiber core, and a conversion shaft for connecting the conversion switch and the converter; the converter can move circumferentially around the conversion shaft.

Further, the conversion portion comprises a curved surface portion and a flat portion, wherein the flat portion can rotate to an extent that is connected with the fiber accommodating groove and both surfaces form the same plane.

The curved surface portion comprises a first spacing slot part and an inclined slot part, wherein the flat portion comprises a second spacing slot part, and the groove bodies in the first spacing slot part, the inclined slot part and the second spacing slot part are in the same number and are interpenetrated.

The first spacing slot part and the second spacing slot part are parallel to each other and have different groove body pitches in each slot part, and the inclined slot part is interpenetrated and connected with the first spacing slot part and the second spacing slot part.

Further, the spacing of the groove body of the first spacing slot part is larger than that of the groove body of the second spacing slot part.

Further, the spacing of the groove body of the first spacing slot part is less than that of the groove body of the second spacing slot part.

Further, the conversion shaft is fixedly connected with the conversion switch, the conversion shaft is flat, the converter comprises a flat shaft hole fitting the conversion shaft; and when the conversion switch is rotated, the converter is rotated synchronously with the conversion switch.

Further, the cover comprises an elastic body and an elastic body accommodating groove for accommodating the elastic body, and the elastic body protrudes from the inner surface of the cover.

The body comprises the elastic body accommodating groove that is wider than the fiber accommodating groove, and the bottom of the elastic body accommodating groove is higher than the fiber accommodating groove, and the height and the width fit the elastic body.

Further, the body is provided with a magnet, and the cover is made of a magnetic material, and one end of the cover may be connected to the body through the magnet to close the cover.

Further, one side of the cover far away from the rotating shaft is provided with a bent portion far away from the body.

Further, the body is also provided with a plurality of fixed connection holes for connection with other devices.

The invention also provides a fiber spacing adjustment method, that is to say, by use of the previously-mentioned fiber holding tool, after the fiber to be used is placed in the fiber holding tool and clamped, the spacing between the individual optical fiber cores is adjusted by rotating the spacing conversion portion.

The beneficial effects of the present invention are:

1. The fiber holding tool according to the present invention can have the original fusion splicer continually used without replacing the matched fusion splicer, which is convenient for use and greatly saves the cost.

2. The fiber holding tool according to the present invention can achieve the clamping of the ribbon fiber of 200 µm, and the conversion of the ribbon fiber having a spacing of 200 μm into 250 μm, which is low in cost, and can ensure welding quality, and reduce welding loss.

3. The present invention can be applied to various optical communication equipment simultaneously, including fiber cleavers and fusion splicers, with simple and easy operation.

REFERENCE NUMBERS IN THE FIGURES

1 Body 11 Fiber accommodating groove 12 Elastic body accommodating groove 13 Conversion gap 14 First accommodating through hole 15 Second accommodating through hole 16 Magnet 17 Fixed connection hole 2 Cover 21 Elastic body accommodating place 22 Elastic body 23 Bent portion 3 Spacing conversion portion 31 Conversion switch 32 Converter 33 Conversion shaft 321 Curved surface portion 322 Flat portion 3211 Shaft hole 3212 First spacing slot part 3213 Inclined slot part 3221 Second spacing slot part 32121 First groove body 32122 Second groove body 32123 First spacing 4 Rotating shaft 5 Fiber.

DETAILED DESCRIPTION

Hereinafter, the present invention will be described further with reference to the preferred embodiments and with reference to the accompanying drawings.

Figure 1:
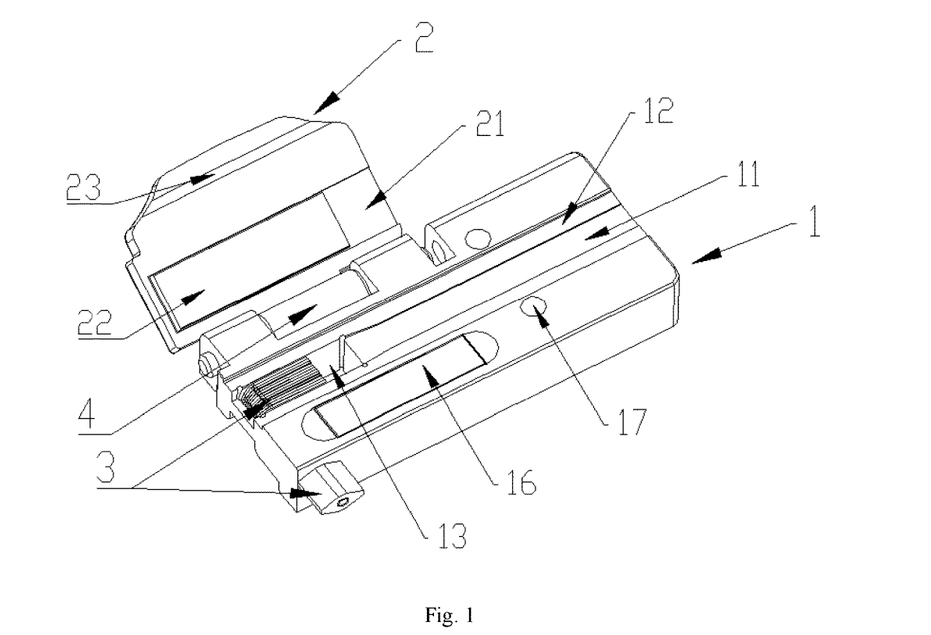
FIG. 1 is a schematic view showing the overall structure of the fiber holding tool according to the present invention.
Figure 2:
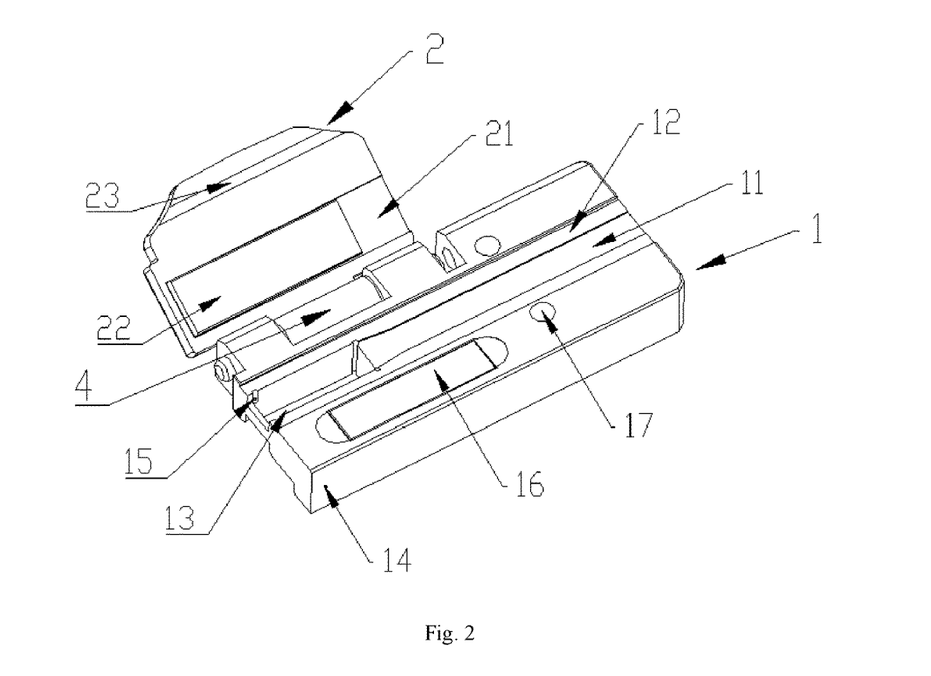
FIG. 2 is a schematic view showing the overall structure of the fiber holding tool body according to the present invention with the removal of the spacing conversion portion.

As shown in FIG. 1 and FIG. 2, the fiber holding tool referred to in the present invention comprises a body 1 and a cover 2, among which, the body 1 and the cover 2 are pivotally connected by a rotating shaft 4, and the fiber holding tool comprises a spacing conversion portion 3 that is rotated relative to the body 1.

The body 1 is provided with a fiber accommodating groove 11 for accommodating the fiber, an elastic body accommodating groove 12 for accommodating a conversion gap 13 of the spacing conversion portion 3, a first accommodating through hole 14 and a second accommodating through hole 15 for accommodating and connecting the spacing conversion portion 3, a magnet 16 for closing in cooperation with the upper cover 2, and a fixed connecting hole 17 for connecting with other devices. Preferably, the elastic accommodating groove 12 is wider than the fiber accommodating groove 11 so as to cover all of the clamped fibers when they are clamped. Preferably, the bottom of the elastic body accommodating groove 12 is higher than that of the fiber accommodating groove 11, so that when the fiber is clamped, the elastic body 22 does not press into the fiber too deeply, and damage caused by excessive pressing of the fiber is avoided. The height and width of the elastic body accommodating groove 12 fit the elastic body 22. The body 1 is also provided with a plurality of fixed connection holes 17 for connection with other devices, such as fiber cleavers and fusion splicers, and the connection can be in the following manner as: to set up a protruding convex column on fusion splicers and fiber cleavers, sleeve the fixed connection hole 17 into the convex column, so that the connection of the fiber holding tool according to the present invention with other devices can be realized quickly.

The cover 2 is a magnetizer, and one end of the cover 2 is sucked with a magnet 16 on the body 1 to close the cover 2. An elastic body 22 protruding from the cover 2 is set up thereon to accommodate the elastic body accommodating place 21 of the elastic body 22, and facilitate the opening of the bent portion 23 by the cover 2. The bent portion 23 is provided so as to be bent in a direction away from the body 1, so as to facilitate grasping of the operator's fingers and application of force toward the open direction.

As shown from FIG. 1 to FIG. 4, the spacing conversion portion 3 comprises a conversion switch 31, a converter 32, and a conversion shaft 33 for connecting the conversion switch 31 and the converter 32; the conversion switch 31 is fixedly connected with the conversion shaft 33, and the converter 32 can move circumferentially around the conversion shaft 33. The conversion shaft 33 is flat, and a shaft hole 3211 fitting the shape of the conversion shaft 33 is set up on the converter 32. As a result, when the conversion switch 31 is rotated to drive the conversion shaft 33 to rotate, the converter 32 is rotated synchronously with the conversion switch 31.

Figure 3:
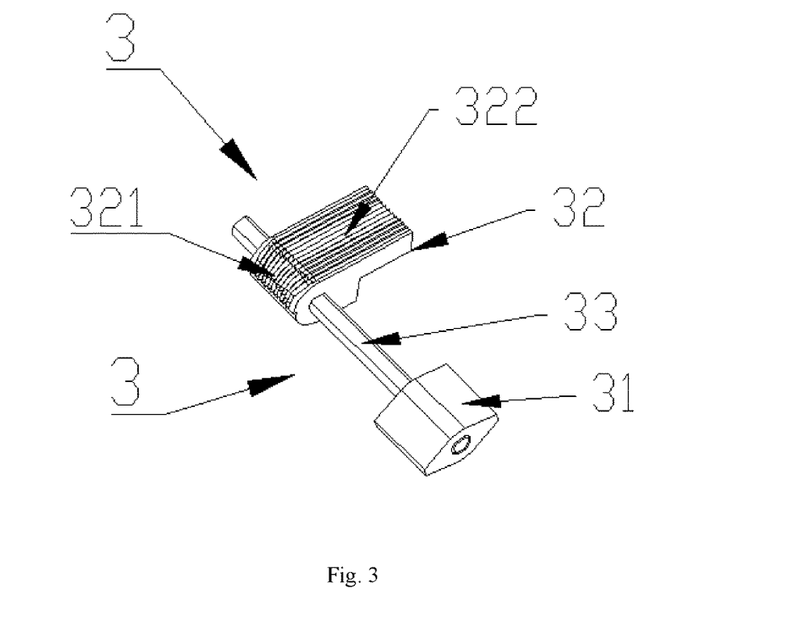
FIG. 3 is a schematic view showing the overall structure of the spacing conversion portion of the fiber holding tool according to the present invention.
Figure 4:
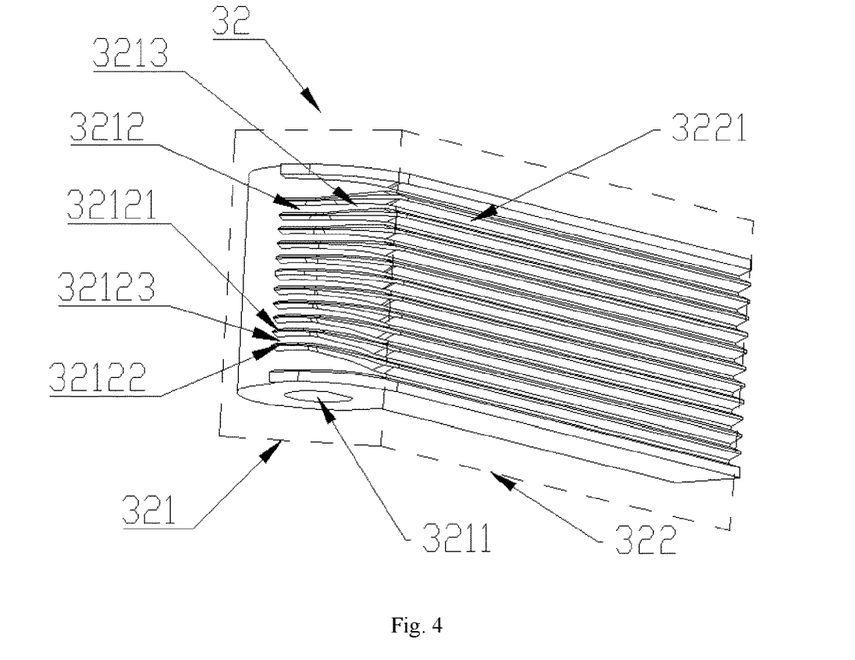
FIG. 4 is a schematic view showing the overall structure of the converter of the fiber holding tool according to the present invention.

The converter 32 comprises a curved surface portion 321 in a curved surface with the entire body and a flat portion 322 in a flat surface with the entire body, the curved surface portion 321 is provided with a first spacing slot part 3212 located at the end of the groove body of the spacing conversion portion 3 as well as an inclined slot part 3213 connected with the first spacing slot part 3212; the flat portion 322 is provided with a second spacing slot part 3221 located at the tail of the groove body of the spacing conversion portion 3, the first spacing slot part 3212, the inclined slot part 3213 and the second spacing slot part 3221 comprise a plurality of groove bodies, and these groove bodies are in the same number and are interpenetrated. After the optical fiber conversion is completed, the flat portion 322 is located in the same plane as the fiber accommodating groove 11 so that the fiber core can be flatly accommodated in the second spacing slot part 3221 and the fiber accommodating groove 11 of the flat portion 322.

In the present invention, the groove body is a plurality of strip-shaped protrusions protruding from the surface of the spacing conversion portion 3, the spacing of the groove body is the distance between every two adjacent groove bodies. Now, only 2 groove bodies at the lower end of FIG. 4 are described as an example. The first groove body 32121 and the second groove body 32122 are those "groove bodies" as referred to in this patent, and the distance between the first groove body 32121 and the second groove body 32122 is the first spacing 32123, i.e. the "spacing of the groove body" as referred to in this patent.

The groove bodies of the first spacing slot part 3212 are parallel to each other, and the groove bodies of the second spacing slot part 3221 are also parallel to each other. Preferably, the groove bodies of the first spacing slot part 3212 and the groove bodies of the second spacing slot part 3221 are also parallel to each other. The spacing between the end part and the tail part of the groove body is different, that is, the spacing of the groove body at the first spacing slot part 3212 is different from that at the second spacing slot part 3221, and the inclined slot part 3213 is penetrated and connected with the first spacing slot part 3212 and the second spacing slot part 3221. The first spacing slot part 3212 adjusts the fiber spacing before the ribbon fiber conversion, the second spacing slot part 3221 adjusts the fiber spacing after the ribbon fiber conversion, and the first spacing slot part 3212 and the second spacing slot part 3221 perform the fiber spacing conversion through the connection of the inclined slot part 3213.

In this embodiment, the spacing of the groove body of the first spacing slot part 3212 is smaller than that of the second spacing slot part 3221, the spacing of the groove body of the first spacing slot part 3212 is 200 µm, the spacing of the groove body of the second spacing slot part 3221 is 250 µm, and the spacing of the groove body of the inclined slot part 3213 is between 200 µm and 250 µm; similarly, when the spacing of the groove body of the first spacing slot part 3212 is 250 µm and the spacing of the groove body of the second spacing slot part 3221 is 200 µm, the spacing of the groove body of the inclined slot part 3213 is still between 200 µm and 250 µm. It is also within the scope of the present invention to simply convert the spacing width of the parallel spacing grooves, so it will not be described here.

Next, as shown from FIG. 5 to FIG. 14, a fiber spacing adjustment method provided by the present invention will be described. The fiber holding tool according to the present invention comprises three states, namely the initial state, the conversion state, and the completion state. When operated, the fiber holding tool according to the present invention is firstly placed in an initial state, and when the fiber placement is completed, the fiber holding tool gradually enters a conversion state until the completion state is reached, the fiber conversion operation of the fiber holding tool is thus completed.

Figure 5:
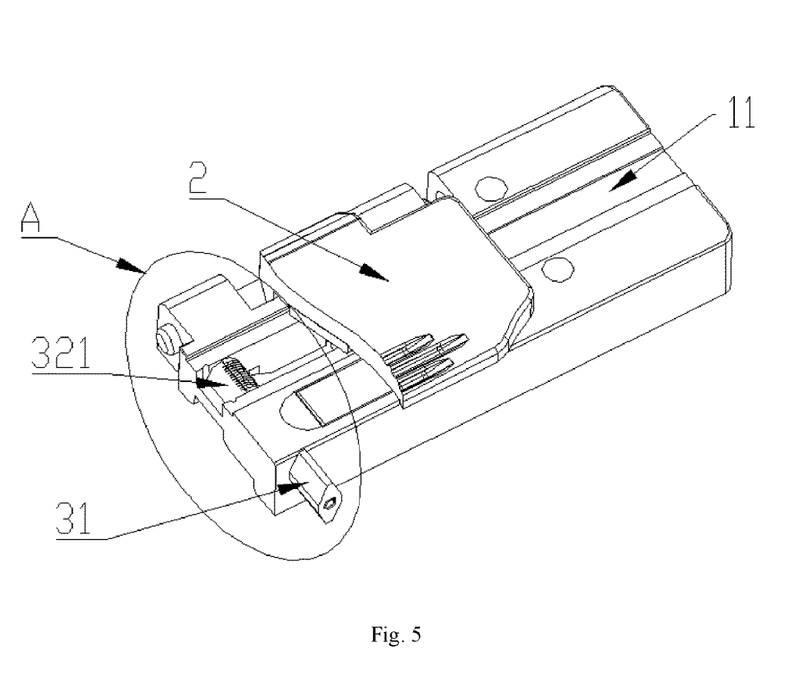
FIG. 5 is a schematic view showing the overall structure of the fiber holding tool according to the present invention under the initial state.
Figure 8:
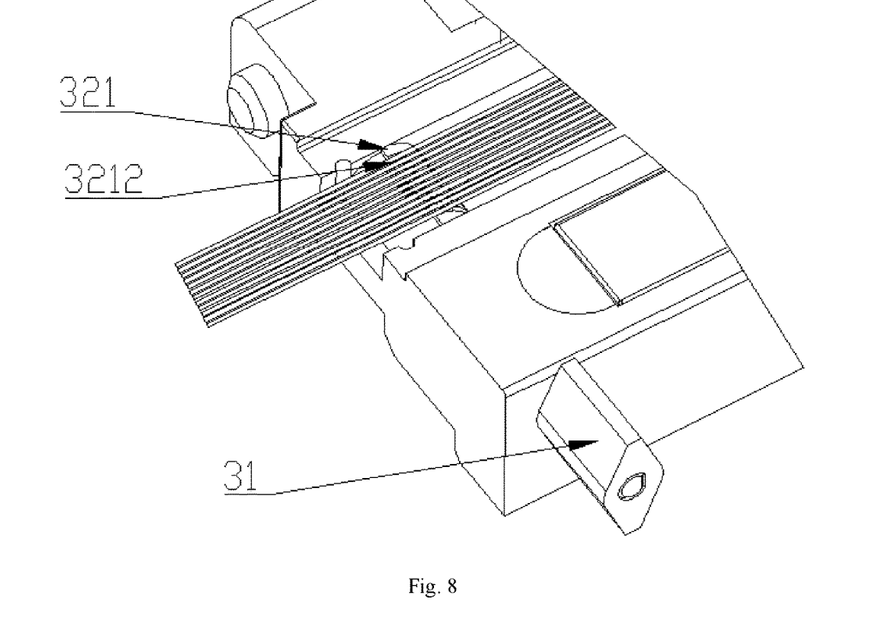
FIG. 8 is the close-up view of section B as shown in FIG. 7.

As shown in FIG. 5 and FIG. 8, when used, the fiber holding tool is firstly placed in an initial state.

Figure 6:
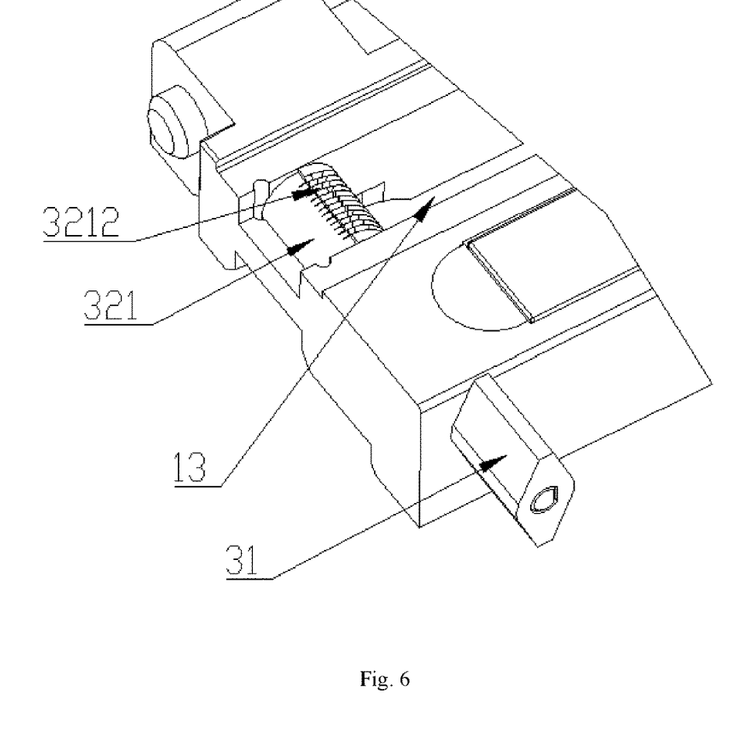
FIG. 6 is the close-up view of section A as shown in FIG. 5.
Figure 7:
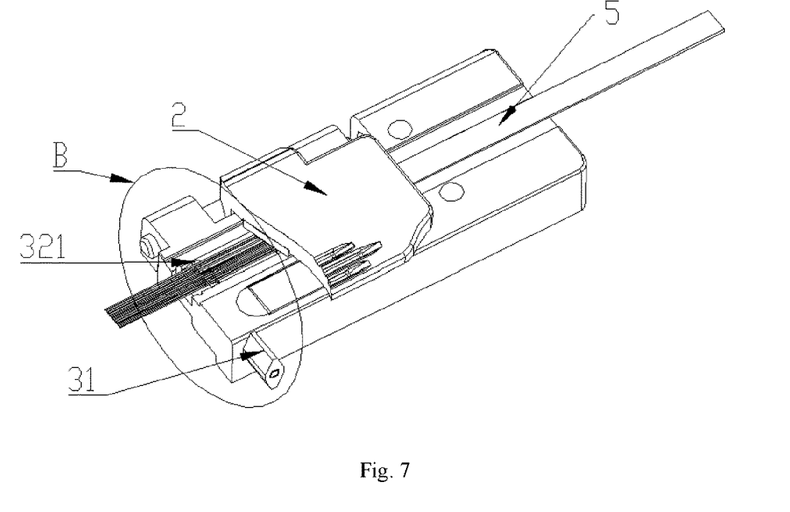
FIG. 7 is a schematic view showing the overall structure of the fiber holding tool according to the present invention under the initial state and clamping the fiber.

Specifically, before the laying of optical fibers in the fiber holding tool, the conversion switch 31 is rotated so that the curved surface portion 321 of the spacing converter 3 is in the same plane as the fiber accommodating groove 11, the first spacing conversion groove 3212 is in the same horizontal plane as the fiber accommodating groove 11. As shown in FIG. 6, after the ribbon fiber is placed in the fiber accommodating groove 11, the front side of the optical fiber automatically falls into the groove body of the first spacing conversion groove 3212, and when the body 1 and the cover 2 are closed, the elastic body 22 on the cover 2 falls into the elastic body accommodating groove 12, and the elastic body 22 presses the optical fiber in the groove body of the first spacing conversion groove 3212 to prevent the disengagement of the optical fibers from the groove body of the first spacing conversion groove 3212.

Figure 9:
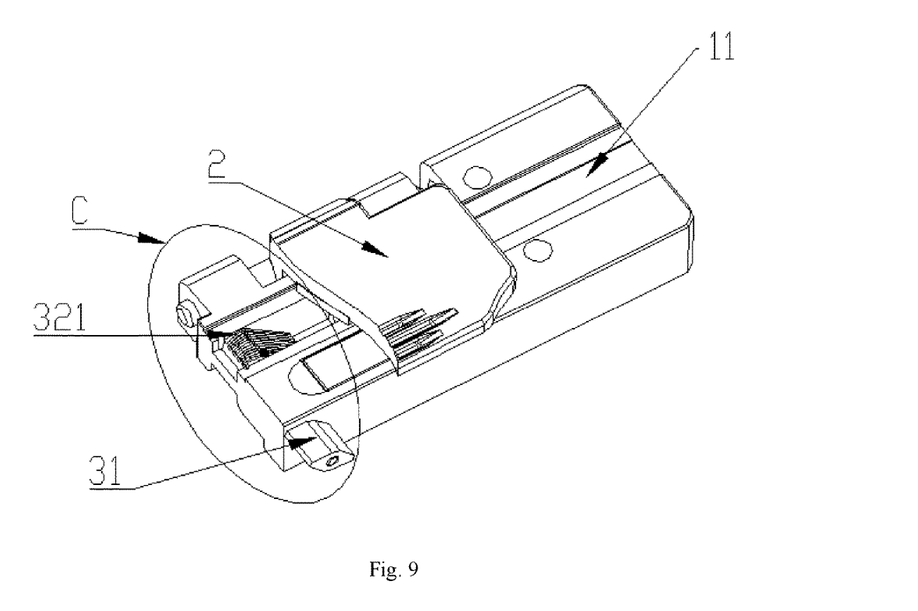
FIG. 9 is a schematic view showing the structure of the fiber holding tool according to the present invention under the conversion state.
Figure 10:
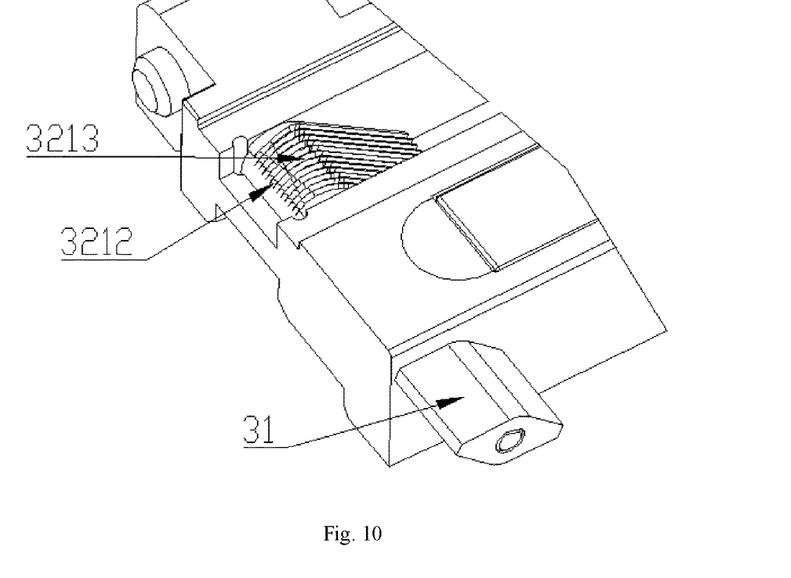
FIG. 10 is the close-up view of section C as shown in FIG. 9.
Figure 11:
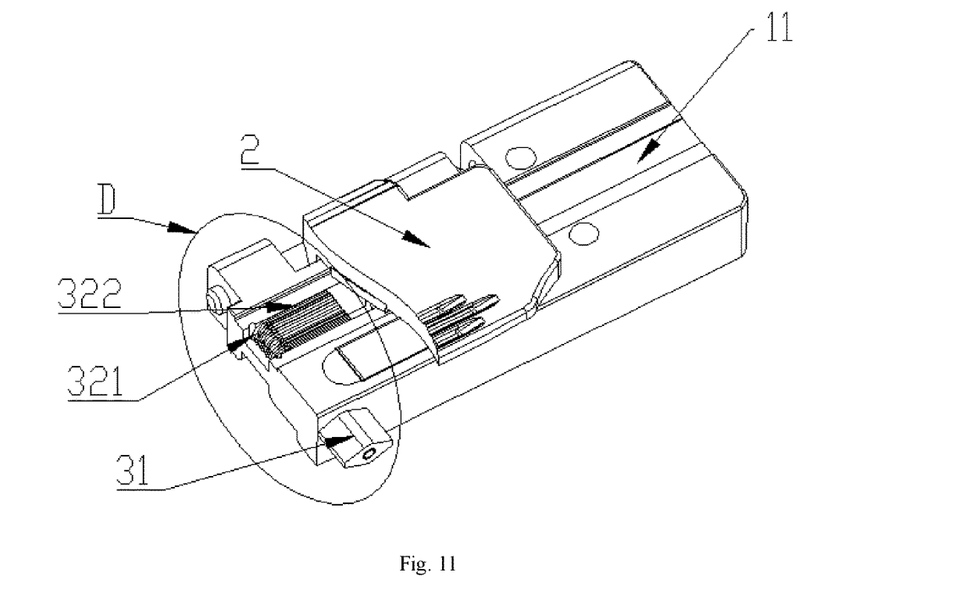
FIG. 11 is a schematic view showing the overall structure of the fiber holding tool according to the present invention under the completion state.
Figure 12:
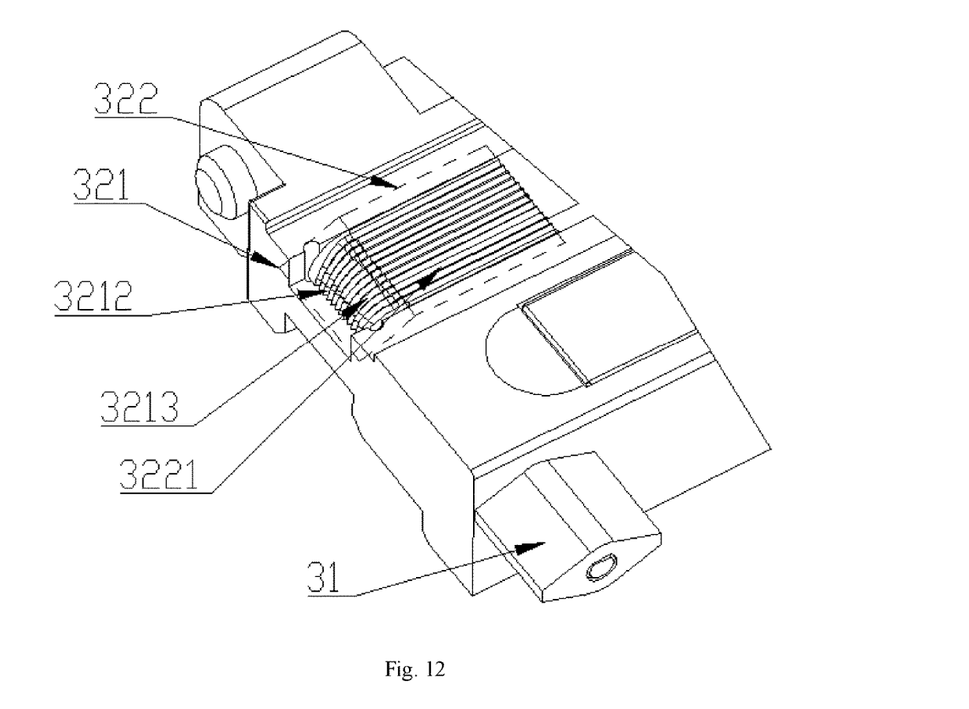
FIG. 12 is the close-up view of section D as shown in FIG. 11.
Figure 13:
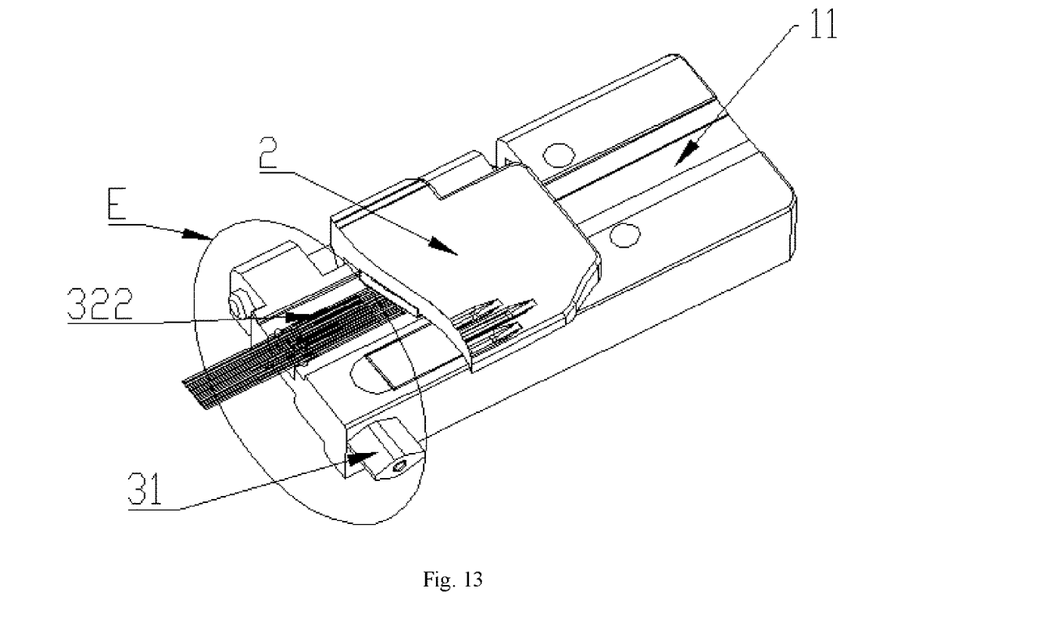
FIG. 13 is a schematic view showing the overall structure of the fiber holding tool according to the present invention under the completion state and clamping the fiber.
Figure 14:
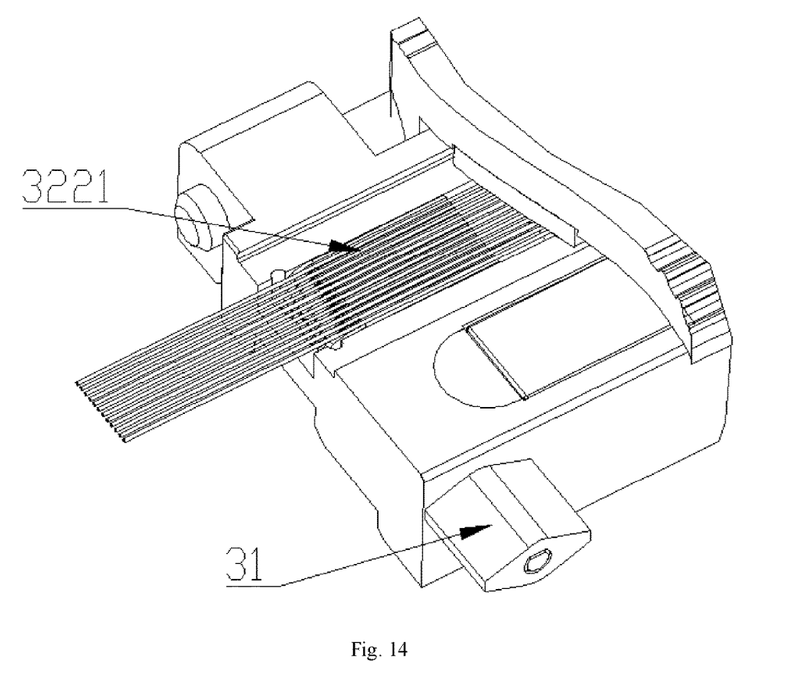
FIG. 14 is the close-up view of section E as shown in FIG. 13.

As shown in FIG. 9 and FIG. 10, after the fiber clamping is completed, the conversion switch 31 is rotated to bring the fiber holding tool into the conversion state.

Specifically, after the optical fiber is clamped, the conversion switch 31 is rotated by an external force, thereby driving the rotation of the spacing conversion portion 3, and the converter 32 is also rotated synchronously. Since the groove bodies of the first spacing slot part 3212 and the inclined slot part 3213 are interpenetrated with each other, the optical fiber will naturally extend from the groove body of the first spacing slot part 3212 into that of the inclined slot part 3213, and at this time, the spacing of the optical fiber cores starts to change, so that each optical fiber core is no longer parallel, but becomes larger or smaller according to the spacing of the groove body of the inclined slot part 3213.

As the conversion switch 31 continues rotating, the optical fiber continues moving in the groove body of the inclined slot part 3213, and when the conversion switch 31 is rotated to the end of the curved surface portion 321, the movement of the optical fiber in the groove body of the inclined slot part 3213 also enters the end, and at this time, the spacing conversion between the optical fibers is maximized.

As shown in FIG. 11 through FIG. 14, with the rotation of the conversion switch 31, the curved surface portion 321 is rotated to a plane perpendicular to the fiber accommodating groove 11, the flat portion 322 is rotated to the same plane as the fiber accommodating groove 11 and cannot continue rotating, and at this time, the fiber holding tool enters the completion state.

Specifically, since the groove bodies of the inclined slot part 3213 and the second spacing slot part 3221 are interpenetrated with each other, the optical fiber will naturally extend from the groove body of the inclined slot part 3213 into that of the second spacing slot part 3221, and at this point, the ribbon fiber has completed the spacing conversion, and the spacing of the optical fiber cores after conversion is the distance with the second spacing slot part 3221.

The above has been described in detail with respect to the specific embodiments of the present invention. It will be apparent to those skilled in the art that various modifications and adaptations may be made to the present invention without departing from the principles of the invention, which are also intended to be within the scope of the appended claims.

What is claimed is:

1. A fiber holding tool for a fusion splicer, comprising:
   a body;
   a cover, wherein the body and the cover are pivotally connected by a rotating shaft, and the body comprises a fiber accommodating groove used to accommodate a fiber; and
   a spacing conversion portion that can be rotated relative to the body,
   wherein the body comprises a conversion gap accommodating the spacing conversion portion; the spacing conversion portion comprises a plurality of groove bodies for accommodating optical fibers, and a spacing between an end part of the groove body and a tail part is different from each other;

the spacing conversion portion comprises a conversion switch, a converter for converting a spacing of an optical fiber core, and a conversion shaft for connecting the conversion switch and the converter; and the converter can move circumferentially around the conversion shaft.

2. A fiber holding tool according to claim 1, wherein:

the spacing conversion portion comprises a curved surface portion and a flat portion, wherein the flat portion can rotate to a same plane as the fiber accommodating groove;

the curved surface portion comprises a first spacing slot part and an inclined slot part, wherein the flat portion comprises a second spacing slot part, and the groove bodies in the first spacing slot part, the inclined slot part and the second spacing slot part are in the same number and are interpenetrated;

the first spacing slot part and the second spacing slot part are parallel to each other and have different groove body pitches in each slot part, and the inclined slot part is interpenetrated and connected with the first spacing slot part and the second spacing slot part.

3. A fiber holding tool according to claim 2, wherein:

the spacing of the groove body of the first spacing slot part is larger than that of the groove body of the second spacing slot part.

4. A fiber holding tool according to claim 2, wherein:

the spacing of the groove body of the first spacing slot part is less than that of the groove body of the second spacing slot part.

5. A fiber holding tool according to claim 3, wherein:

the conversion shaft is fixedly connected with the conversion switch, the conversion shaft is flat, the converter comprises a flat shaft hole fitting the conversion shaft; and when the conversion switch is rotated, the converter is rotated synchronously with the conversion switch.

6. A fiber holding tool according to claim 5, wherein:

the cover comprises an elastic body and an elastic body accommodating groove for accommodating the elastic body, and the elastic body protrudes from an inner surface of the cover;

the body comprises the elastic body accommodating groove that is wider than the fiber accommodating groove, and the bottom of the elastic body accommodating groove is higher than the fiber accommodating groove, and the height and the width fit the elastic body.

7. A fiber holding tool according to claim 6, wherein:

the body is provided with a magnet, and the cover is made of a magnetic material, and one end of the cover may be connected to the body through the magnet to close the cover.

8. A fiber holding tool according to claim 7, wherein:

one side of the cover far away from the rotating shaft is provided with a bent portion far away from the body.

9. A fiber holding tool according to claim 8, wherein:

the body is also provided with a plurality of fixed connection holes for connection with other devices.

10. A fiber spacing adjustment method for a fiber holding tool for a fusion splicer including a body, a cover, and a spacing conversion portion rotatable relative to the body, wherein the body and the cover are pivotally connected by a rotating shaft, and the body comprises a fiber accommodating groove used to accommodate a fiber; the body comprises a conversion gap accommodating the spacing conversion portion; the spacing conversion portion comprises a plurality of groove bodies for accommodating optical fibers, and a spacing between an end part of the groove body and a tail part is different from each other; the spacing conversion portion comprises a conversion switch, a converter for converting a spacing of an optical fiber core, and a conversion shaft for connecting the conversion switch and the converter; and the converter can move circumferentially around the conversion shaft, the method comprising:

placing a fiber to be used in the fiber holding tool, wherein the fiber includes a plurality of individual optical fiber cores;

clamping the fiber using the fiber holding tool; and adjusting spacing between the individual optical fiber cores by rotating the spacing conversion portion of the fiber holding tool.

\* \* \* \* \*